3,453,197
CYCLOBUTANE DERIVATIVES
David J. Trecker and Joseph P. Henry, South Charleston, W. Va., and Richard L. Brandon, Palo Alto, Calif., assignors to Union Carbide Corporation, a corporation of New York
No Drawing. Original application Jan. 24, 1964, Ser. No. 339,872. Divided and this application Apr. 22, 1966, Ser. No. 559,362
Int. Cl. C07c 3/24
U.S. Cl. 204—162               3 Claims

ABSTRACT OF THE DISCLOSURE

The method for the production of dienecyclobutanes selected from the group consisting of 1,2-divinyl-1,2-dimethylcyclobutane and 1-vinyl-1-methyl-2-isopropenylcyclobutane, which comprises bringing isoprene into admixture with a photosensitizer selected from the group consisting of benzophenone, benzil, 2,3-pentanedione, acetophenone, 2-acetonaphthone, benzaldehyde, and 1-chloronaphthalene and irradiating the resulting mixture with light energy for a period of time sufficient to produce said dienecyclobutane.

---

This is a divisional application of application Ser. No. 339,872 filed Jan. 24, 1964, now abandoned.

The present invention is concerned with the production of novel and useful diolefinically substituted cycloaliphatic compounds and derivatives thereof. In particular, the invention is concerned with the novel dienecyclobutanes: 1,2-divinyl-1,2-dimethylcyclobutane of the formula I 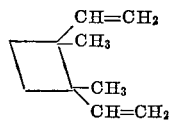

and 1-vinyl-1-methyl-2-isopropenylcyclobutane of the formula

II 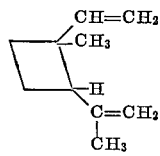

and with their diol derivatives.

A convenient method for producing the dienecyclobutanes of this invention resides in the photosensitized dimerization of isoprene. Such a photochemical reaction is carried out by admixing isoprene with a sensitizer whose triplet state is capable of transferring energy to isoprene sufficient to convert the later to its own triplet state, such as benzil, 2,3-pentanedione, acetophenone, 2-acetonaphthone, benzaldehyde, 1-chloronaphthalene, benzophenone, etc. The resulting mixture is then irradiated in an inert atmosphere with light energy sufficient to convert the sensitizer to its triplet state. The term "light energy," as employed herein, includes wavelengths in both the invisible and ultraviolet spectrum as well as in the intermediate visible spectrum. Suitable sources of light energy include tungsten bulbs, daylight, a mercury vapor arc, argon arc, etc. Preferred are those sources of light energy which emit in the wavelength range of from about 1,800 to about 7,000 Angstroms.

The proportion in which the reactants are employed can vary broadly, typically in the range of from about 1 to about 50 moles of isoprene per mole of the sensitizer, preferably from about 10 to about 50 mole of isoprene per mole of the sensitizer, and most preferably, from about 10 to about 20 mole of isoprene per mole of the sensitizer based on the lowest concentration of sensitizer compatible with complete absorption of the actinic light. It has also been found desirable to incorporate a polymerization inhibitor, such as para-tertiary-butyl catechol etc., in the reaction mixture.

The reaction temperature can also vary broadly, typically in the range of from about —20° C. to about 80° C. and preferably from about 0° C. to about 30° C.; i.e., broadly, cold enough to prevent competing thermal reactions, and yet warm enough to ensure maximum diffusion in solution. When within the above temperature range, the reaction is generally carried out, i.e., irradiation continued, for a period of from about 24 to about 96 hours.

Upon completion of the photochemical reaction, a mixture of the dienecyclobutanes described above in trans form is ordinarily produced together with minor amounts of by-products. The product mixture can be resolved in any convenient manner, as for instance, by fractional distillation, and the products isolated and analyzed by gas chromatography.

The dienecyclobutanes of this invention can be polymerized in accordance with conventional processes for the polymerization of olefinically unsaturated compounds to produce useful polymers. The dienecyclobutanes can also be reacted in accordance with conventional processes for the epoxidation of olefinically unsaturated compounds to produce the corresponding mono- and diepoxides. The latter products can, in turn, be homopolymerized or reacted with organic hardeners such as polycarboxylic acids or anhydrides, polyamines, or polyols to produce curable resins having a wide variety of uses.

The dienecyclobutanes of this invention are particularly well suited for use as precursors for the novel diolcyclobutanes: 1,2-dimethyl-1,2-dimethylolcyclobutane of the formula III 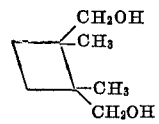

derived from the dienecyclobutane of Formula I and 1-methyl-1-methylol-2-(1-hydroxyethyl)cyclobutane of the formula IV 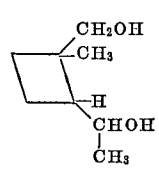

derived from the dienecyclobutane of Formula II.

Diol III may be prepared by ozonolysis of I to trans-1,2-dimethylcyclobutane-1,2-dicarboxylic acid and subsequent reduction by metal hydrides (e.g. LiAlH$_4$) or hydrogen over a metal catalyst (e.g., Ni or Pd). Similarly II may be ozonolyzed to 1-methyl-2-acetylcyclobutane-1-carboxylic acid, which is reduced to IV by metal hydries or hydrogen and an appropriate catalyst (Raney Ni or Pd).

Alternatively, the diols III and IV may be prepared from I and II by the following reaction sequence:
(a) Diepoxidation with peracetic acid or hydrogen peroxide;
(b) Acid hydrolysis of the resulting diepoxides to the corresponding tetraols;

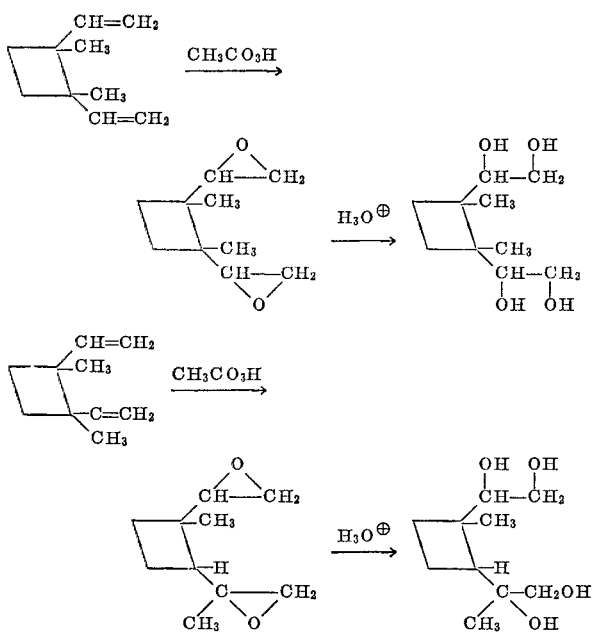

(c) Oxidative cleavage of the tetraols with lead tetracetate or periodic acid to the corresponding dicarboxylic acid and keto carboxylic acid;

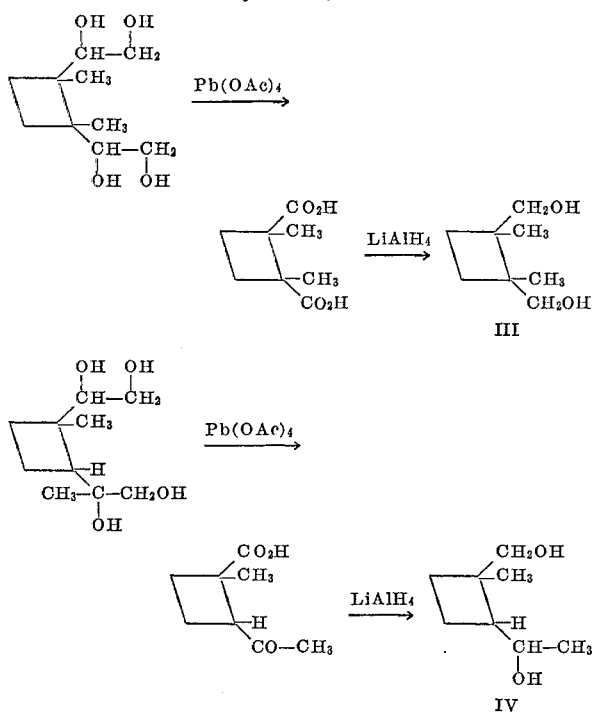

and (d) Reduction to III and IV by metal hydrides (e.g., LiAlH$_4$) or hydrogen and an appropriate catalyst (e.g., Raney Ni or Pd).

The diolcyclobutanes of this invention can, in turn, be employed to react with a wide variety of aliphatic and aromatic carboxylic acids anhydrides and esters via conventional esterification or transesterification reactions to produce polyesters suitable for use as lubricants, precursors for fibers, molded articles, coatings, etc. Typical dicarboxylic reactants include adipic acid, sebacic acid, phthalic anhydride, etc., as well as the anhydrides and lower alkyl esters thereof. These diols also can form useful polycarbonates by reaction with phosgene or ester exchange with lower-alkyl carbonates. The polyesters and polycarbonates thus formed are not only suitable for use as indicated above, but in use, may in addition demonstrate superior thermal stabiilty as compared with polyesters derived by the reaction of the same dicarboxylic compound with other diolcyclobutanes.

The following examples serve to illustrate the present invention, but not to limit the invention.

EXAMPLE I

To a Pyrex glass reactor there were charged 374 grams of isoprene, 25 grams of benzil and 0.1 of para-tertiary-butylcatechol. The reactor was purged with nitrogen for one hour. The contents of the reactor were then irradiated for 72 hours using a 450 watt high pressure mercury arc lamp emitting light energy having wavelengths of 2200–6000 A. During this period the temperature within the reactor was maintained at about 21° C. by means of a brine-cooled acetone bath, while a gentle stream of nitrogen was continuously passed through the reaction mixture. The reaction mixture was then fractionally distilled to yield a fraction (B.P. 48–51° C./20 mm.) composed predominantly of 1,2-divinyl-1,2-dimethylcyclobutane and a second fraction (B.P. 55–58° C./20 mm.) composed predominantly of 1 - vinyl - 1-methyl-2-isopropenylcyclobutane. Analysis of the foregoing products following preparative gas chromatography and redistillation yielded the following results:

Calculated for 1,2 - divinyl - 1,2-dimethylcyclobutane ($C_{10}H_{16}$): C, 88.15; H, 11.85; parent mass, 136. Found: C, 87.94; H, 11.66; parent mass, 136.

Calculated for 1 - vinyl - 1-methyl-2-isopropenylcyclobutane ($C_{10}H_{16}$): C, 88.15; H, 11.85; parent mass, 136. Found: C, 88.10; H, 12.03; parent mass, 136.

The efficiency of reaction, calculated:

$$\frac{\text{(moles of specific product)}}{\begin{pmatrix}\text{moles isoprene} - \text{moles isoprene}\\ \text{fed} \hspace{1cm} \text{recovered}\end{pmatrix}} \times 100$$

to provide 1,2 - divinyl - 1,2-dimethylcyclobutane and 1-vinyl-1-methyl-2-isopropenylcyclobutane, was found to be 19.9 percent and 17.9 percent respectively, based upon isoprene.

EXAMPLE II 1,2 - divinyl - 1,2-dimethylcyclobutane (11.6 grams, 0.085 mole) was taken up in 75 milliliters methanol, cooled to −30° C. and ozonized with a Welsbach T–23 ozonator until a residual blue color remained in the flask. The methanol was then removed on a rotary evaporator. 90 percent formic acid (100 milliliters) was added, and the solution was slowly heated to reflux (two hour period) under a steady oxygen flow, to which was periodically added catalytic amounts of ozone. The mixture was held at reflux for 30–45 minutes, then cooled. The solution gave a negative peroxide test at the end of this time. Evaporation of the formic acid afforded crystals dispersed in a dark residue. The crystalline material was separated by suction filtration and twice sublimed in vacuo. The trans-1,2-dimethylcyclobutane-1,2-dicarboxylic acid thus obtained melted at 236–237° (sealed tube).

*Analysis.*—Calc'd for $C_8H_{12}O_4$: C, 55.81; H, 6.98; neutralization equivalent, 86.1. Found: C, 55.77; H, 6.74; neutralization equivalent, 86.3.

1 - vinyl - 1 - methyl-2-isopropenylcyclobutane (10.5 grams, 0.077 mole) was taken up in 75 milliliters methanol and ozonized as described previously. Two methods of workup were investigated. During one run in which methanol was evaporated directly from the reaction mixture (at 250° C.), the dimethoxy hydroperoxide formed from II exploded violently. A more reliable technique was found to be that of adding 100 ml. 90 percent formic acid directly to the ozonized material while it was still in methanol, then removing the methanol in vacuo at temperatures below 35° C. The oxidative workup was carried out as described above. This run was repeated three times. The combined residues were fractionated through a 24-inch Nester and Faust spinning band column. The principal fraction (15.5 grams, B.P. 95–116° C. at 1 mm.) was neutralized with aqueous sodium carbonate and extracted with ether. The aqueous portion was reacidified, extracted with ether, and the ether extracts were dried over anhydrous sodium sulfate. Evaporation of the ether afforded an oil, which, when redistilled, gave pure 1 - methyl - 2-acetylcyclobutane-1-carboxylic acid (B.P. 113–115° at 2 mm., $n_D^{20}$ 1,4666, infrared spectrum consistent with structure).

Analysis.—Calc'd for $C_8H_{12}O_3$: C, 61.54; H, 7.69; neutralization equivalent, 156.2. Found: C, 61.42; H, 7.73; neutralization equivalent, 156.3.

The nuclear magnetic resonance spectrum of the ozonolysis product showed sharp singlets at 8.75 and 7.92τ, corresponding to the proton of the ring methyl group and acetyl methyl group, respectively. Resonances due to the ring methylene protons appeared as multiplets centered at 8.48, 8.28, 7.80 and 7.60τ. The cyclobutyl ring methine gave rise to a quartet at 6.37τ (8.0 c.p.s. and 6.5 c.p.s.), while the carboxylic acid proton appeared at −1.45τ. All integrated areas corresponded well to assigned protons.

Trans - 1,2 - dimethylcyclobutane-1,2-dicarboxylic acid (10 grams, 0.058 mole) in anhydrous ether (100 milliliters) is added dropwise to a stirred solution of LiAlH$_4$ (3.5 grams, 0.088 mole) in anhydrous ether (300 milliliters). Stirring is continued for two hours after addition is complete. The reaction mixture is hydrolyzed by the dropwise addition of a 90 percent ethanol solution (100 milliliters). The organic layer is decanted away from the LiAlO$_2$ paste, dried over anhydrous sodium sulfate, and distilled. In this manner, trans-1,2-di(methylol)-1,2-dimethylcyclobutane is obtained.

1 - methyl - 2-acetylcyclobutane-1-carboxylic acid (10 grams, 0.071 mole) in anhydrous ether (100 milliliters) is similarly reduced by LiAlH$_4$ (2.4 grams, 0.062 mole) in anhydrous ether (300 milliliters). 1-methylol-1-methyl-2-(1-ethylol)cyclobutane is obtained by fractional distillation.

Though the above specifically describes the invention, such is not to be construed to limit the invention except to the extent provided in the claims.

What is claimed is:
1. The method for the production of dienecyclobutanes selected from the group consisting of 1,2-divinyl-1,2-dimethylcyclobutane and 1 - vinyl - 1-methyl-2-isopropenylcyclobutane, which comprises bringing isoprene into admixture with a photosensitizer selected from the group consisting of benzophenone, benzil, 2,3-pentanedione, acetophenone, 2-acetonaphthone, benzaldehyde, and 1-chloronaphthalene and irradiating the resulting mixture with light energy for a period of time sufficient to produce said dienecyclobutane.

2. The method for the production of dienecyclobutanes selected from the group consisting of 1,2-divinyl-1,2-dimethylcyclobutane and 1 - vinyl - 1-methyl-2-isopropenylcyclobutane, which comprises bringing isoprene into admixture with a photosensitizer selected from the group consisting of benzophenone, benzil, 2,3-pentanedione, acetophenone, 2-acetonaphthone, benzaldehyde, and 1-chloronaphthalene and irradiating the resulting mixture with light energy at a wavelength in the range of from about 1,800 to about 7,000 Angstrom and at a temperature of from about −20° C. to about 80° C. for a period of time sufficient to produce said dienecyclobutane.

3. The method according to claim 2 wherein isoprene to photosensitizer are provided in a molar proportion of from about one to one to about 50 to one based upon the lowest concentration of sensitizer compatible with complete absorption of the actinic light from said light energy.

References Cited

Srinivasan: J.A.C.S., vol. 84 (Nov. 5, 1962), pp. 4141–45.

Journal of American Chemical Society, 83 (1961), pp. 4674–75.

Journal of American Chemical Society, 85 (1963), pp. 477–8.

HOWARD S. WILLIAMS, *Primary Examiner.*

U.S. Cl. X.R.

260—666